Feb. 13, 1934.  W. FERRIS  1,946,902
HYDRAULIC FEED MECHANISM
Filed April 5, 1926  2 Sheets-Sheet 2
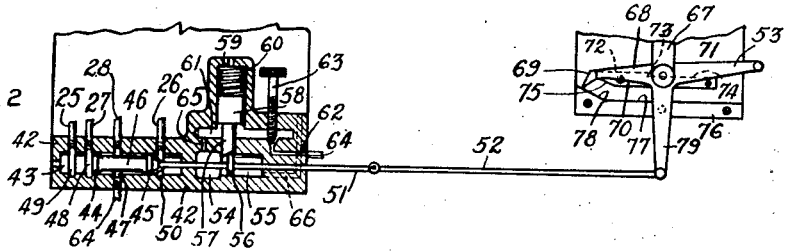
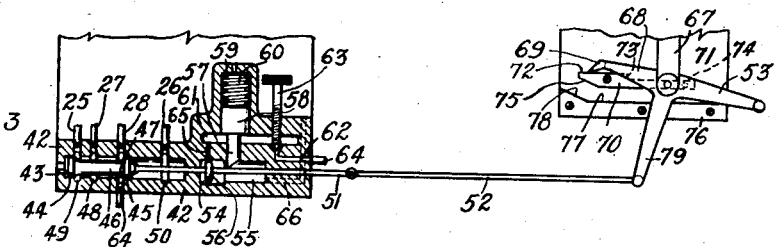
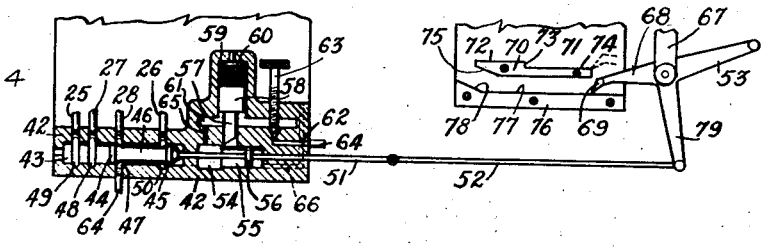
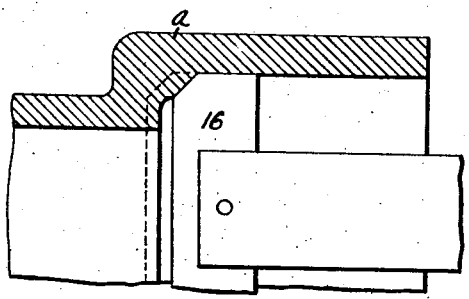
INVENTOR
WALTER FERRIS.
BY
ATTORNEY Patented Feb. 13, 1934

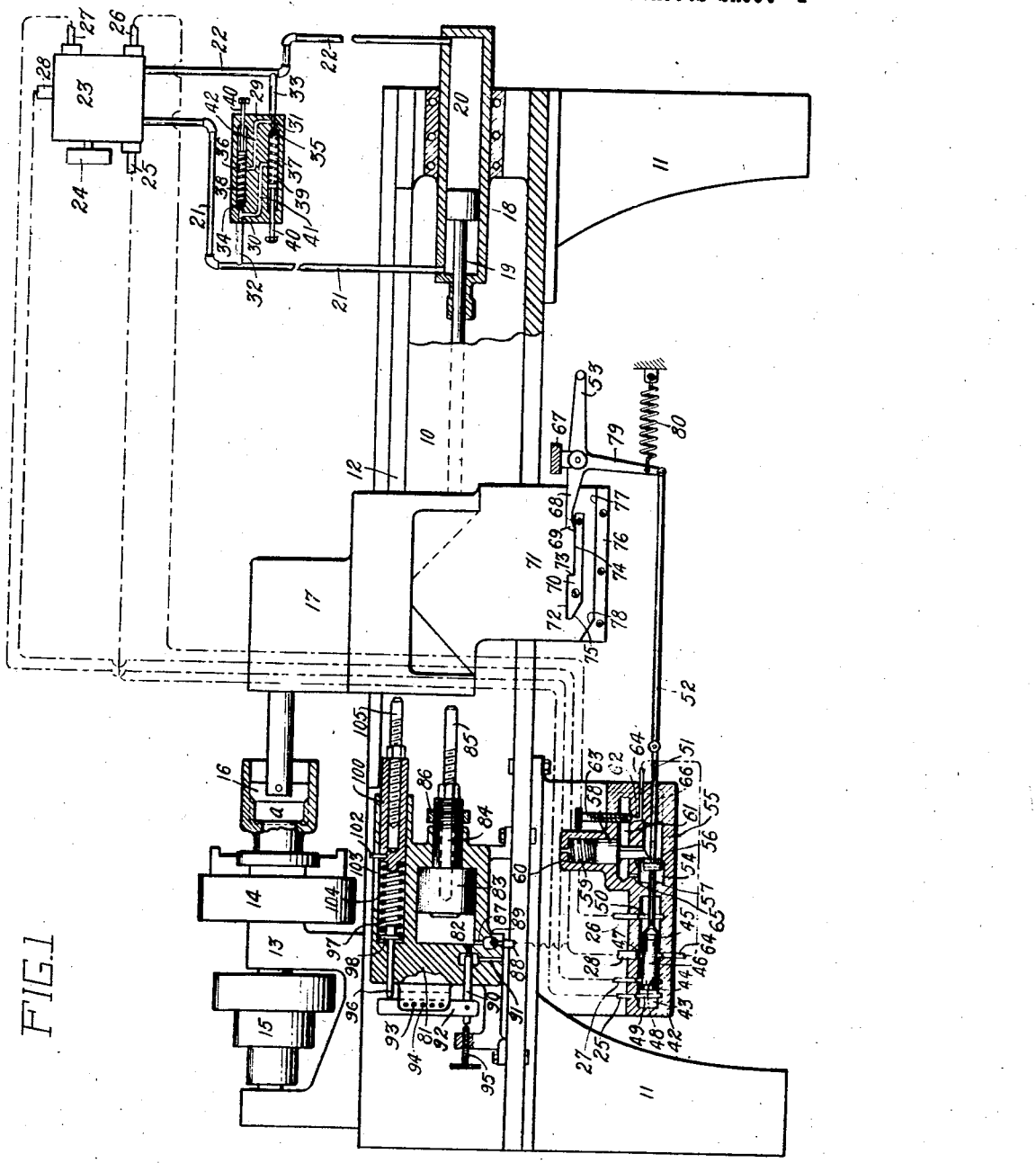

1,946,902

UNITED STATES PATENT OFFICE 1,946,902

HYDRAULIC FEED MECHANISM

Walter Ferris, Milwaukee, Wis., assignor to The Oilgear Company, Milwaukee, Wis., a corporation of Wisconsin Application April 5, 1926. Serial No. 99,800

12 Claims. (Cl. 82—2).

This invention relates to feed mechanisms for lathes, drills, boring mills and the like and particularly to controls therefor.

In the ordinary mechanically fed lathe the feeding force is immediately released at the end of the feed stroke, so that the tool ordinarily withdraws from the face of the cut before it has an opportunity to smooth off the face. This leaves a mark or gash upon the face which is undesirable in some classes of work. To obtain a smooth finish it is necessary for the operator at the end of the cut, to hold the tool against the work until it has finished off the cut.

One object of the present invention is the provision of a feed mechanism which will effect a desired feed motion through a definite distance and, at the end of the cut, hold the tool to the work for an interval of time necessary for the tool to finish off the face of the cut.

In many instances the amount of material removed by the tool varies at different stages of the cut, because of the peculiar contour of the work or of the tool. In order to avoid injury or damage to the tool, it is necessary or at least highly desirable that the rate of feed be reduced during the heavier cuts. Another object is the provision of novel mechanism for accomplishing this function.

Another object is the provision of improved means for determining with extreme accuracy the limit of the feed stroke and for effecting automatic reversal and return of tool or work.

Other objects and advantages will appear from the following description of an illustrative embodiment of the present invention.

In the drawings:—

Figure 1 is a diagrammatic view, in side elevation, of a lathe equipped with a hydraulic feed mechanism embodying the present invention.

Figs. 2, 3, and 4 are views of the control valve and lever in various positions assumed during successive stages of an operating cycle.

Fig. 5 is an enlarged fragmentary view of the work and tool.

The lathe shown in Figure 1 includes the usual bed 10, mounted on legs 11, and supporting the usual ways 12 and head stock 13. A conventional chuck is shown at 14 mounted on the usual spindle and driven by cone pulleys 15. A tool 16 is fixed upon the usual tool carriage 17 mounted to travel along the ways 12 toward and from the chuck. The tool carriage is driven by a piston 18, connected thereto through a piston rod 19 and reciprocating in a power cylinder 20 fixed in the bed of the lathe.

The opposite ends of the cylinder 20 are connected through pipes 21 and 22 respectively, with a constant speed, variable displacement, reversible flow pump mechanism 23. The pump mechanism shown is fully described in Patent No. 1,854,127 issued April 12, 1932. It will suffice here to say that this pump is driven at constant speed through a pulley 24 and the rate and direction of liquid discharged thereby is controlled by the application of fluid pressure to one or another of the pipes 25, 26, and 27. When no pressure exists in any of these three pipes, pump displacement is zero and there is no flow of liquid in the pipes 21 and 22. When fluid pressure is applied to pipe 25 only, the pump discharges liquid at a relatively high rate through pipe 22 into the right end of cylinder 20 and receives liquid through pipe 21 from the left end of the cylinder. The piston 18 is thus driven toward the left and the tool carriage advanced toward the work at a rate desirable for rapid traverse. When pressure is applied to pipe 26 only, the pump discharges liquid at a relatively high rate through pipe 21 into the left end of the cylinder and receives liquid through pipe 22 from the right end of the cylinder, so that the tool carriage is withdrawn from the work at a speed desirable for rapid return. When fluid pressure is applied to the pipe 27 only, the pump discharges liquid at a relatively slow rate through pipe 22 into the right end of the cylinder and receives liquid through pipe 21, so that the tool carriage is fed toward the work at an appropriate cutting speed. Pressure is never applied to both pipes 25 and 26 at the same time. With the application of pressure to both pipes 25 and 27, the pump delivers liquid through pipe 22 and receives liquid from pipe 21 at a rate equal to the sum of the rates produced when each of these pipes are subjected to pressure separately. As long as the pump is in operation it maintains a substantially constant pressure within a pipe 28 leading therefrom. As above pointed out the various instrumentalities for effecting the above results are fully described in the patent hereinabove mentioned, and a further or more detailed description of the pump mechanism is deemed unnecessary for a complete understanding of the present invention.

It will be noted that the pipes 21 and 22 constitute two sides of a hydraulic circuit through which the piston 18, and consequently the tool carriage, are normally caused to move at a rate and in a direction corresponding to the rate and direction of flow of the liquid discharged from the pump. In this instance a high pressure relief mechanism is connected across the circuit. The mechanism shown includes a valve block 29 having passages 30 and 31 communicating through pipes 32 and 33, with pipes 21 and 22, respectively. The inner end of each passage 30 and 31 is normally closed by a ball check valve 34—35, yieldably retained on its seat under the pressure of a spring 36—37 disposed in a bore 38—39. A screw plunger 40 is employed to vary and control the tension of each spring 36—37 in a manner well known. A by-pass 41 connects passage 30 with bore 39 and a by-pass 41' connects passage 31 with bore 38. The arrangement is such that so long as the pressure in pipes 21 or 22 is insufficient to lift the valves 34 or 35, respectively, communication between these pipes is prevented. Should the pressure in pipe 21 exceed a predetermined maximum however, valve 34 opens and fluid escapes through passage 30, bore 38 by-pass 41', and passage 31 into the pipe 22, similarly, should the pressure in pipe 22 exceed a predetermined maximum valve 35 opens and fluid escapes through passage 31, bore 39, by-pass 41 and passage 30 into the pipe 21.

The pump in this instance is placed under the control of a pilot valve such as will now be described. This valve comprises a block 42 mounted upon the lathe bed and having a cylindrical chamber 43 therein. A piston valve having two heads 44 and 45 connected by a reduced portion 46 is closely fitted for lengthwise reciprocation within this chamber. The valve is hollow so as to maintain communication between the two ends of the chamber. An annular groove 47 formed in the wall of the chamber 43, intermediate the ends thereof, is in open communication with the pressure supply pipe 28, through which the annular space surrounding the intermediate reduced portion 46 of the piston valve is maintained with liquid under pressure. A second annular groove 48 formed in the chamber 43 communicates with pipe 27, a third groove 49 communicates with pipe 25 and a fourth groove 50 with pipe 26. Grooves 49 and 50 are disposed adjacent the opposite ends of the chamber 43 and groove 48 between grooves 49 and 47.

The arrangement is such that when the piston valve is in the intermediate position shown in Figure 2, the annular space surrounding the reduced portion 46 of the valve is open to the pipe 28 only. By shifting the valve into the left extreme position shown in Figure 3, pipes 27 and 25 are exposed to the fluid pressure existing in pipe 28. By shifting the valve into the position shown in Figure 1, pipe 27 only is exposed to the pressure existing in pipe 28. By shifting the valve into the right extreme position of Figure 4 pipe 26 only is exposed to the pressures existing in pipe 28.

The pilot valve is controlled by a stem 51 operatively connected through appropriate linkage 52 with a control lever 53, to be hereinafter described. For purposes which will hereinafter appear an appropriate form of dashpot mechanism is provided for retarding the movement of the valve from the position shown in Figure 1 into that shown in Figure 4.

The dashpot mechanism shown includes a chamber 54 within the block 42 having a reduced cylindrical extension 55 communicating therewith. The valve control stem 51 extends through this chamber and carries a piston 56 fixed thereto. The piston 56 is sized to closely fit the extension 55 but is somewhat smaller than the larger portion of the chamber 54. A reciprocating detent 57 carried by a piston 58 mounted in a cylindrical bore 59 above the chamber extension 55 is adapted to project into the extension 55 into the path of travel of the piston 56. The piston 58 and detent 57 is yieldably retained in the lower position of Figure 1 under the pressure of a spring 60.

The lower face of piston 58 is exposed to a passage 61 into which fluid is admitted from a passage 62 controlled by an appropriate needle valve 63. Passage 62 is always exposed to liquid under pressure supplied through a pipe 64 which is in open communication with the groove 47 containing fluid under pressure. Passage 61 also communicates through a passage 65 with the chamber 54. The right end of the cylindrical extension 55 is always open to an overflow passage 66 which extends upwardly through the block to a level above the passage 61. The passage 61 and chambers 54 and 55 are thus maintained flooded with liquid from pipe 64.

The arrangement is such that when the pilot valve is in the position shown in Figure 1 or Figure 3, with the piston 56 withdrawn from the cylindrical extension 55, the liquid entering the passage 61 from passage 62 is free to escape through passage 65, chamber 54, extension 55 and overflow passage 66, so that no pressure exists in passage 61, and the piston 58 is retained by spring 60 in the lower position shown in these figures with the detent 57 projecting into the extension chamber 55. Upon movement of the valve stem 51 toward the right, to shift the pilot valve, the piston 56 enters the extension chamber 55 and is retained against further movement by engagement with the detent 57. In such position the piston 56 blocks off the escape of liquid from chamber 54 so that pressure is established in this chamber and in passage 61, as liquid is supplied from passage 62. As the pressure in passage 61 increases the piston 58 rises against the pressure of spring 60, and lifts the detent 57 so as to release the piston 56, and permit the stem 51 and the pilot valve to move toward the right. The time required for this pressure to lift the detent 57 into releasing position is determined by the setting of the needle valve 63.

In this instance an automatic control is provided for the pilot valve. The control shown includes a three armed lever 53, rockably supported upon a fixed bracket 67, mounted at a convenient point upon the bed of the lathe. One arm 68 of the control lever is provided with a lug 69 arranged to follow an appropriate cam plate 70 secured to a tail piece 71 carried by the tool carriage. The upper edge of the cam plate shown comprises a straight horizontal portion 72, a shoulder 73, and a second straight horizontal portion 74 below the plane of the straight portion 72. The lower edge of the cam plate is straight throughout the major portion of its length and adjacent one end is provided with an inclined portion 75. A second cam plate 76 beneath the plate 70 has an upper straight edge portion 77 paralleling the lower edge of plate 70 and an inclined portion 78 paralleling the inclined portion 75 and offset laterally therefrom. The lower depending arm 79 of the lever is connected through linkage 52 with the stem 51 of the pilot valve, and an appropriate spring 80 connected with this arm tends at all times to rock the lever in a counter-clockwise direction and to shift the pilot valve toward the right.

In the particular work at hand the work piece is in the form of a hollow casting a and the tool 16 is designed to bore out this casting and to finish off the interior end face thereof. As the tool reaches the end face of the casting, the amount of material to be removed by the tool is greatly increased, and it is therefore highly desirable that the feeding rate of the tool be reduced to compensate for this heavier cut. Provision is therefore made in the machine shown for retarding the advance of the tool, as it approaches the interior end face of the work.

The mechanism shown for this purpose comprises a dashpot including a block 81, fixed to the bed of the lathe, and provided with a cylindrical chamber 82, containing a piston 83 reciprocable therein. The piston carries a ram 84, internally threaded to receive a plunger 85, adjustably fixed therein. The ram 84 is externally threaded to receive a stop collar 86 adjustably fixed thereon. The rear end of chamber 82 is maintained flooded with liquid under pressure through a pipe 88 connected with pipe 28 and controlled by an inwardly opening check valve 89. The escape of liquid from chamber 82 is controlled by a needle valve 90, and discharges through a drain passage 91. The needle valve 90 is controlled by a lever 92 pivotally connected adjacent its lower end to the needle valve, and rockably supported intermediate its ends upon a pivot pin 93 removably fixed in one of a series of holes 94 in the block 81, and extending through one of a corresponding series of holes (not shown) in the lever. An adjustable set screw 95 determines the limit of the opening movement of the needle valve.

A spring pressed plunger 96 reciprocally mounted in the block 81 maintains a yielding pressure against the lever 92 adjacent its upper end in such direction as to yieldably retain the needle valve 90 in closed position. The plunger 96 projects into a bore 97 in the block 81 and is provided with a head 98. A plunger 100 is mounted for reciprocation in the bore 97. Outward movement of the plunger 100 is limited by any appropriate means such as a pin 102 fixed thereto and extending through a slot 103 in the block 81. A coiled spring 104, within the bore 97, presses at its opposite ends against the plunger 100 and head 98 of plunger 96, respectively. The plunger 100 is internally threaded to receive an extension plunger 105 adjustably fixed therein.

Plunger 85 extends parallel to and within the path of movement of the tool carriage, so that, as the carriage approaches the end of its feeding stroke it abuts the end of the plunger and forces the same inwardly against the resistance offered by the body of liquid trapped within the chamber 82. Further advance of the tool carriage is thus effectively retarded, the liquid escaping slowly from the chamber 82 past the needle valve 90. During this retarded advance the pump continues to discharge liquid into pipe 22 at a predetermined rate, but the resistance offered to the advance of the tool carriage causes the pressure in pipe 22 to build up until relief valve 35 opens and the excess liquid is by-passed through this valve, passages 41 and 30 and pipe 32 into the other pipe 21 and returns to the pump. During this retarded advance the piston and tool carriage are advanced by the driving liquid under constant pressure, and the rate of advance is determined largely by combined resistance offered by the work and plunger 85 and is controlled by the rate of escape of liquid from chamber 82 past the needle valve 90.

This rate of escape of liquid and the degree of pressure in chamber 82 required to open the needle valve are varied by varying the tension in spring 104. In this instance the plunger 105 is so adjusted and positioned as to be engaged by the tool carriage during the latter part of its feed stroke, so that, as the carriage advances, it forces plunger 105 and, consequently, plunger 100 toward the left so as to compress the spring 104. The pressure exerted by the spring 104 is thus progressively increased as the plunger is forced to the left by the advancing carriage, and the needle valve is thus yieldably held closed by a correspondingly increasing pressure, so that the body of liquid in chamber 82 offers a correspondingly increasing resistance to the advance of the tool carriage, and the rate of advance of the tool carriage is progressively reduced accordingly.

The plunger 105 may be so set as to be engaged by the tool carriage either before, just as, or after the carriage has engaged plunger 85, dependent upon the character of the work, but in this instance the plunger 105 is shown so set as to be engaged prior to the engagement of the carriage with plunger 85. When so arranged the plunger 100 is so moved by the carriage as to compress spring 104 to thereby apply a closing pressure to the needle valve prior to the engagement of the carriage with plunger 85, so that the instant the carriage strikes the plunger 85, it is suddenly retarded, and thereafter, as the spring 104 becomes further compressed, the advance of the carriage becomes progressively slower. By so setting the plunger 105 as to delay the engagement of the carriage therewith the retardation of the carriage at the time it engages the plunger 85 is not so pronounced.

The effect of the spring 104 upon the needle valve may be further modified by transferring the pivot pin 93 into another of the holes 94 to thereby shift the fulcrum point of the lever and vary the effective lengths of the two ends of the lever.

A brief description of the operation will now be given. Assume that the pump is in operation, so that predetermined fluid pressure is maintained in pipe 28, and that the valve is in the neutral position shown in Figure 2, in which position the pipes 25, 26 and 27 are blocked off from communication with the annular space around the reduced portion 46 of the valve by the valve heads 44 and 45. None of the pipes 25, 26 or 27 are subjected to pressure so that no liquid is flowing in the pipes 21 and 22, and the piston 18 and tool carriage are at rest. Such is the condition of the parts before beginning an operating cycle, the tool carriage being in its right extreme position away from the work and the lug 69 of the control lever resting upon the inclined portion 78 of the cam plate 76.

To begin an operating cycle, the operator tilts the control lever 53 in a clockwise direction so as to shift the valve into the left extreme position shown in Figure 3, and so as to raise the lug 69 of the lever from contact with the cam surface 78 into position above the horizontal portion 72 of cam plate 70. This adjustment of the valve opens communication between pressure pipe 28 and pipes 25 and 27, and the pressure established therein effects an adjustment of the pump, so as to cause the same to deliver liquid at a relatively high rate through pipe 22 into the right end of the cylinder 20 and to receive liquid from the left end of the cylinder through pipe 21. This causes a rapid advance of the tool carriage toward the work, and the cam plate 70, carried thereby passes beneath the lug 69 of the control lever. As soon as the tool carriage starts to advance the operator releases the control lever and the lug 69 thereof then rests against the horizontal portion 72 of the cam plate under the influence of the spring 80, as indicated in Figure 3.

The tool carriage continues this rapid advance toward the work until the tool 16 is about to engage the work. The shoulder 73 of the cam is so positioned that as the tool is about to engage the work, the lug 69 of the lever drops off of this shoulder onto the depressed horizontal portion 74 of the cam, thus causing a slight counter-clockwise rocking of the control lever 53, so as to cause the valve to be shifted into the position shown in Figure 1. In this position of the valve pipe 27 remains in communication with pressure pipe 28 so that pressure is maintained in pipe 27, but the pressure in pipe 25 is released due to the fact that the head 44 of the valve blocks off communication between this pipe and pressure pipe 28. As hereinabove pointed out pressure in pipe 27 alone causes the pump to deliver liquid through pipe 22 into the right end of the cylinder 20 at a relatively low rate to cause the tool carriage to advance toward the work at a rate appropriate for a normal cutting feed. During this stage of the cycle the tool 16 advances into the work, and as the work revolves, the tool removes the material from the inner side walls of the work as indicated in Figure 1.

The carriage and tool continues to advance at this determined rate until the tool is about to engage the inner end or base wall of the work, at which point the material to be removed is materially increased and the cut becomes heavier. The plunger 85 is so adjusted in the ram 84 that, as this point is reached, the tool carriage engages the end of the plunger 85 and its further advance is retarded by the resistance offered by the body of liquid trapped in the chamber 82 behind the piston 83, as hereinabove pointed out. The plunger 105 is so adjusted in the plunger 100 as to be engaged by the tool carriage before the carriage has reached the plunger 85, and is shifted toward the right by the carriage to thereby increase the tension in spring 104 to a predetermined degree. As above pointed out the tension in spring 104, transmitted to the needle valve 90 through lever 92, determines the degree of resistance offered by the liquid in chamber 82 to movement of the piston 83, and thus determines the resistance offered by the plunger 85 to the continued advance of the carriage and tool. The advance of the carriage and tool is thus retarded by the plunger 85 and the resistance offered by the work so that during this final cutting stage the rate of feed is materially reduced.

It will be noted that during the normal cut, that is, while the tool is removing material from the sides of the work piece, the working pressure in pipe 22 normally remains below that required to open the pressure relief valve 35, so that the tool advances at a definite rate as determined by the rate at which the pump delivers the driving liquid through pipe 22. The instant that the carriage strikes the plunger 85, however, it is retarded, the pressure instantly builds up in pipe 22 to a degree sufficient to open the relief valve, the excess liquid is by-passed into the other side of the circuit, and the pressure of the driving liquid in the right end of the cylinder is maintained substantially constant. Thereafter the rate of advance is determined by the combined resistance offered by the plunger 85 and the work itself, and by the rate at which the liquid is permitted to escape past the needle valve 90. As above pointed out the plunger 85 offers a progressively increasing resistance as the carriage continues to advance, due to the continued compression of spring 104, and the consequent increasing closing pressure applied to the needle valve 92.

It will also be noted that, during this retarded advance of the carriage under the action of the driving liquid at constant pressure within the right end of the cylinder 20, the resistance offered by the work to this advance is a factor in determining the rate of advance. This is an advantageous condition, particularly during a heavy cut, because if the work piece is particularly hard it offers a greater resistance to the advance of the tool and the advance becomes slower, and if the work piece is particularly soft the resistance is less thus permitting a faster advance. The tool is thus protected against excessive overloads.

Under normal conditions the carriage and tool continue to advance at this reduced rate, forcing the plunger 85 and ram 84 ahead of it until the stop collar 86 engages the face of the block 81, and positively arrests the tool carriage against further advance. The position of the stop collar 86 upon the ram 84, thus determines the end of the cutting stroke, and provides an extremely accurate means for determining the depth of the cut in the end face of the work piece.

During this advance of the tool carriage the lug 69 continues to follow along the horizontal portion 74 of the cam plate 70 until it reaches the end of this portion as indicated in dotted lines in Figure 4, which occurs just before the stop collar 86 has engaged the face of the block 81. The instant the lug 69 clears the cam plate, the lever 53, is swung in a counter-clockwise direction by the spring 80, and the stem 51 of the valve is shifted toward the right. This movement causes the piston 56 on the valve stem 51 to enter the end of the extension chamber 55, as indicated in dotted lines in Figure 1, where it is temporarily held against further movement by the detent 57.

In this position of the valve stem 51, the pilot valve has not moved sufficiently to block communication between the pressure pipe 28 and pipe 27 so that the pump continues to deliver driving liquid to the pipe 22 to maintain the driving pressure in the cylinder. This condition of the parts is maintained until the tool carriage has been arrested by the engagement of the stop collar 86 with the face of the block 81, and through an interval of time thereafter sufficiently extended for the tool to finish off the end face of the cut, that is, during one or more full revolutions of the spindle.

As previously pointed out this condition is maintained by the detent 57 which remains in the lower position shown in Figure 1 until sufficient liquid under pressure has been admitted to passage 61 to lift the piston 58 and detent 57 out of engagement with the piston 56. The time required to effect this is controlled by the setting of the needle valve 63, which controls the rate of admission of liquid from pipe 64 to the passage 61. As soon as the piston 56 is released, the stem 51 and its valve are shifted by the lever 53 into the position shown in Figure 4. In this position of the valve communication is blocked between pressure pipe 28 and pipes 25 and 27, and communication is established between pressure pipe 28 and pipe 26. With pressure thus established in pipe 26, the pump delivers liquid at a relatively high rate through pipe 21 into the left end of the cylinder 20 and the tool carriage begins a return stroke.

It will be noted that during the time thus required to shift the valve from the forward feeding position of Figure 1 into the return stroke position of Figure 4, the tool carriage has forced the plunger 85 ahead of it until the stop collar 86 has arrested movement of the carriage, and the tool is held against the work, under the pressure of the liquid in the right end of the cylinder, until the tool has had an opportunity to smooth off the face of the cut. The length of time required for this purpose is determined experimentally by the operator, who adjusts the needle valve 63, until the desired result is attained and then normally permits the valve to remain in this adjusted position during continued operation on the particular class of work at hand.

After the pilot valve has been shifted into the position shown in Figure 4, with the lug 69 of the lever 53 resting on the horizontal portion 77 of the cam plate 76, the tool carriage continues its return stroke, carrying the cam plate 76 with it, until the lug 69 has reached the inclined portion 78, and has been lifted thereby into the position shown in Figure 2. In this position the lever 53 and pilot valve are in neutral position, there is no pressure in any of the pipes 25, 26, or 27 and consequently there is no flow of liquid in pipes 21 and 22, and the tool carriage has come to rest.

Various changes may be made in the embodiment of the invention hereinabove specifically described without departing from or sacrificing any of the advantages of the invention as defined in the appended claims.

I claim:—

1. In a lathe the combination of a work holder, a tool carrier movable toward and from the work, driving means therefor, means controlled by said carrier for controlling said driving means to normally regulate the speed and direction of movement of said carrier, means for opposing said driving means to retard the advance of said carrier adjacent the end of its movement toward the work, and means controlled by the advance of said carrier for varying the effectiveness of said retarding means.

2. In a machine tool or the like the combination of relatively movable work and tool supporting members, hydraulically actuated means for driving one of said members, means normally operable to deliver a driving liquid to said driving means at a controlled rate to operate said driven member at controlled speed, and means operable to oppose said driving means to reduce the rate of movement of said driven member, said liquid delivery means responding to said opposing means to deliver liquid to said driving means at controlled pressure.

3. In a machine tool or the like the combination of relatively movable work and tool supporting members, hydraulically actuated means for driving one of said members, means for opposing said driving means to control the rate of movement of said driven member, and means for regulating the action of said opposing means to vary the effect thereof on said driving means.

4. In a machine tool or the like the combination of relatively movable work and tool supporting members, hydraulically actuated means for driving one of said members, means for opposing said driving means to control the rate of movement of said driven member, and means controlled by said member for regulating said opposing means to modify the effect thereof on said driving means.

5. In a machine tool or the like the combination of relatively movable work and tool supporting members, means for driving one of said members, dashpot mechanism for opposing said driving means to control the rate of movement of said driven member, and means for automatically regulating said dashpot mechanism to vary the effect thereof on said driving means during movement of said driven member.

6. In a machine tool or the like the combination of relatively movable work and tool supporting members, means for normally driving one of said members at a controlled rate, means for opposing said driving means to reduce the rate of movement of said driven member, said driving means responding under the action of said opposing means to maintain a controlled driving pressure on said driven member.

7. In a machine tool or the like the combination of relatively movable work and tool supporting members, means for driving one of said members, a dashpot mechanism for resisting the movement of said member, a pressure actuated valve controlling the action of said dashpot mechanism, and means controlled by movement of said member for varying the pressure on said valve.

8. The combination of a driven member, driving means therefor, and means for opposing the action of said driving means to regulate the rate of movement of said member, said opposing means comprising a cylinder and cooperating plunger actuated by movement of said member, means for maintaining said cylinder flooded, a valve controlling the escape of liquid from said cylinder, and means for applying a variable closing pressure to said valve.

9. The combination of a driven member, driving means therefor, means for opposing said driving means to reduce the rate of movement of said member, and a fixed stop for positively arresting the movement of said member.

10. The combination of a driven member, hydraulically actuated means for normally driving said member at a controlled rate, means for opposing said driving means to reduce the rate of movement of said member, and a positive stop for arresting movement of said member at a predetermined point.

11. In a machine tool or the like the combination of members for supporting the work and tool, hydraulically actuated means for advancing and retracting one of said members at controlled rates relative to said other member, means opposing said means to retard the advance of said driven member at a predetermined point in its advance, and a positive stop for accurately limiting said advance.

12. In a machine tool or the like the combination of members for supporting the work and tool, hydraulically actuated means for advancing and retracting one of said members at controlled rates relative to said other member, means opposing said means to retard the advance of said driven member, means automatically operable to regulate said opposing means to vary the effect thereof on said advancing means, and a positive stop for accurately limiting said advance.

WALTER FERRIS.